(12) United States Patent
Wu et al.

(10) Patent No.: US 10,346,566 B2
(45) Date of Patent: Jul. 9, 2019

(54) METHOD AND DEVICE FOR SIMULATING DISK DRIVE

(71) Applicant: EMC IP HOLDING COMPANY LLC, Hopkinton, MA (US)

(72) Inventors: Chao Wu, Shanghai (CN); Krein Zuiliang Peng, Shanghai (CN); Li Zhain, Shanghai (CN); Anita Ying Zhou, Shanghai (CN); Ranky Kui Fan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

(21) Appl. No.: 15/387,723

(22) Filed: Dec. 22, 2016

(65) Prior Publication Data
US 2017/0185705 A1    Jun. 29, 2017

(30) Foreign Application Priority Data
Dec. 29, 2015  (CN) .......................... 2015 1 1019081

(51) Int. Cl.
*G06F 17/50*  (2006.01)

(52) U.S. Cl.
CPC ...... *G06F 17/5009* (2013.01); *G06F 2217/78* (2013.01)

(58) Field of Classification Search
CPC .... G06F 3/0664; G06F 3/0689; G06F 3/0601; G06F 3/0607
USPC .......................................................... 703/21
See application file for complete search history.

(56) References Cited

U.S. PATENT DOCUMENTS

| | | |
|---|---|---|
| 6,657,214 B1 | 12/2003 | Foegelle et al. |
| 7,003,433 B2 | 2/2006 | Yemini et al. |
| 7,107,185 B1 | 9/2006 | Yemini et al. |
| 7,337,090 B1 | 2/2008 | Yemini et al. |
| 7,395,198 B1 | 7/2008 | Roux et al. |
| 8,788,913 B1 | 7/2014 | Xin et al. |
| 8,924,595 B1 | 12/2014 | Joyce et al. |
| 9,158,540 B1 | 10/2015 | Tzelnic et al. |
| 9,280,416 B1 | 3/2016 | Xin et al. |
| 9,286,261 B1 | 3/2016 | Tzelnic et al. |
| 9,519,615 B2 | 12/2016 | Carlson, Jr. et al. |

(Continued)

OTHER PUBLICATIONS

Chris Ruemmler et al, "Modelling Disks", Computer Systems Laboratory HPL—93-68 Jul. 1993 (Year: 1993).*

*Primary Examiner* — Brian S Cook
(74) *Attorney, Agent, or Firm* — BainwoodHuang

(57) ABSTRACT

Embodiments of the present disclosure relate to a method and device for simulating a disk drive. The device includes a converter configured to convert a received first signal for operating the device into a second signal and a third signal. The device further includes a simulation controller configured to control a simulation mode of the device based on the second signal, and the simulation controller is connected to the converter via a communications interface. The device also includes a plurality of simulators configured to simulate a plurality of functions associated with the disk drive based on the third signal, and the plurality of simulators include at least two of an input/output (I/O) performance simulator, a power characteristic simulator and an additional signal simulator, and each of the plurality of simulators is connected to the converter and the simulator controller.

21 Claims, 5 Drawing Sheets

(56) References Cited

U.S. PATENT DOCUMENTS

| | | | |
|---|---|---|---|
| 9,652,568 | B1 | 5/2017 | Tzelnic et al. |
| 9,769,007 | B1 | 9/2017 | Dutch et al. |
| 9,830,626 | B1 | 11/2017 | Aharoni et al. |
| 9,871,889 | B1 | 1/2018 | Daruwalla |
| 10,152,339 | B1 | 12/2018 | Dong et al. |
| 10,209,904 | B2 | 2/2019 | Himelstein et al. |

* cited by examiner

METHOD AND DEVICE FOR SIMULATING DISK DRIVE

RELATED APPLICATIONS

This application claim priority from Chinese Patent Application Number CN201511019081.0, filed on Dec. 29, 2015 at the State Intellectual Property Office, China, titled "DISK DRIVE SIMULATION METHOD AND APPARATUS," the contents of which is herein incorporated by reference in its entirety

FIELD

Embodiments of the present disclosure generally relate to simulation technology, and more specifically relate to a method and disk for simulating a disk drive.

BACKGROUND

In the designing and manufacturing of storage product, some verification steps are generally used to monitor the expander and end devices. Disk drives from different vendors may meet some standards and, realize the required performance so as to guarantee quality of disk drives from different vendors. Though real disk drives from different vendors can be used directly for verification, some negative tests (e.g. tests under extreme conditions) will damage the real disk drives.

To avoid damage to real disk drives, some disk drive simulators arise to simulate functions of the disk drive, such as an input/output (I/O) performance simulator. However, the simulation mode of the traditional disk drive simulator is fixed and cannot be configured according to different test requirement or applied to other platforms. Therefore, the traditional simulators can only simulate few functions, for example, only I/O performance or the power characteristic of the disk drive. Moreover, the traditional disk simulators do not have a standard interface for controlling the simulator.

SUMMARY

In view of the above, embodiments of the present disclosure provide a method and apparatus for simulating disk drive, which can simulate all the output features of different disk drives and improve simulation efficiency of the disk drive. Moreover, the device according to the present disclosure can be configured according to different requirement and support the disk drive simulator with strong communication protocol.

According to an aspect of the present disclosure, a device for simulating a disk drive is disclosed. The device comprises a converter configured to convert a received first signal for operating the device into a second signal and a third signal. The device further comprises a simulation controller configured to control a simulation mode of the device based on the second signal, and the simulation controller is connected to the converter via a communication interface. The device further comprises a plurality of simulators configured to simulate a plurality of functions associated with the disk drive based, on the third signal, and the plurality of simulators comprise at least two of an input/output (I/O) performance simulator, a power characteristic simulator and an additional signal simulator, and each of the plurality of simulators is connected to the converter and the simulation controller respectively.

According to another aspect of the present disclosure. A method for simulating a disk drive is disclosed. The method comprises receiving by a converter a first signal for operating a device for simulating a disk drive and converting the received first signal into a second signal and a third signal. The method further comprises sending the second signal by the converter to the simulation controller via a communication interface in order to control each of the plurality of simulators, wherein the plurality of simulators comprise at least two of an I/O performance simulator, a power characteristic simulator and an additional signal simulator. The method also comprises sending by the converter the third signal to the plurality of simulators to simulate a plurality of functions associated with the disk drive.

According to another aspect of the present disclosure. A device for simulating a disk drive is disclosed. The device comprises a memory and a processor. The processor is configured to receive a first signal for operating a device for simulating a disk drive and to convert the received first signal into a second signal and a third signal. The processor is further configured to send the second signal to the simulation controller via the communication interface to control each of the plurality of simulators, and the plurality of simulators comprise at least two of an O/O performance simulator, a power characteristic simulator and an additional signal simulator. The processor is also configured to send the third signal to the plurality of simulators to simulate a plurality of functions associated with the disk drive.

In the illustrative embodiments of the present disclosure, all the output features of different disk drives can be simulated by configuring a plurality of simulators according to different simulation requirements, thereby improving simulation efficiency of the disk drive.

BRIEF DESCRIPTION OF DRAWINGS

Features, advantages and other aspects of various embodiments of the present disclosure will become more apparent in conjunction with the accompanying drawings with reference to the following detailed depiction, and several embodiments of the present disclosure are illustrated here in an example, but non-limitative, manner, in the accompanying drawings.

DETAILED DESCRIPTIONS

Figure 1:
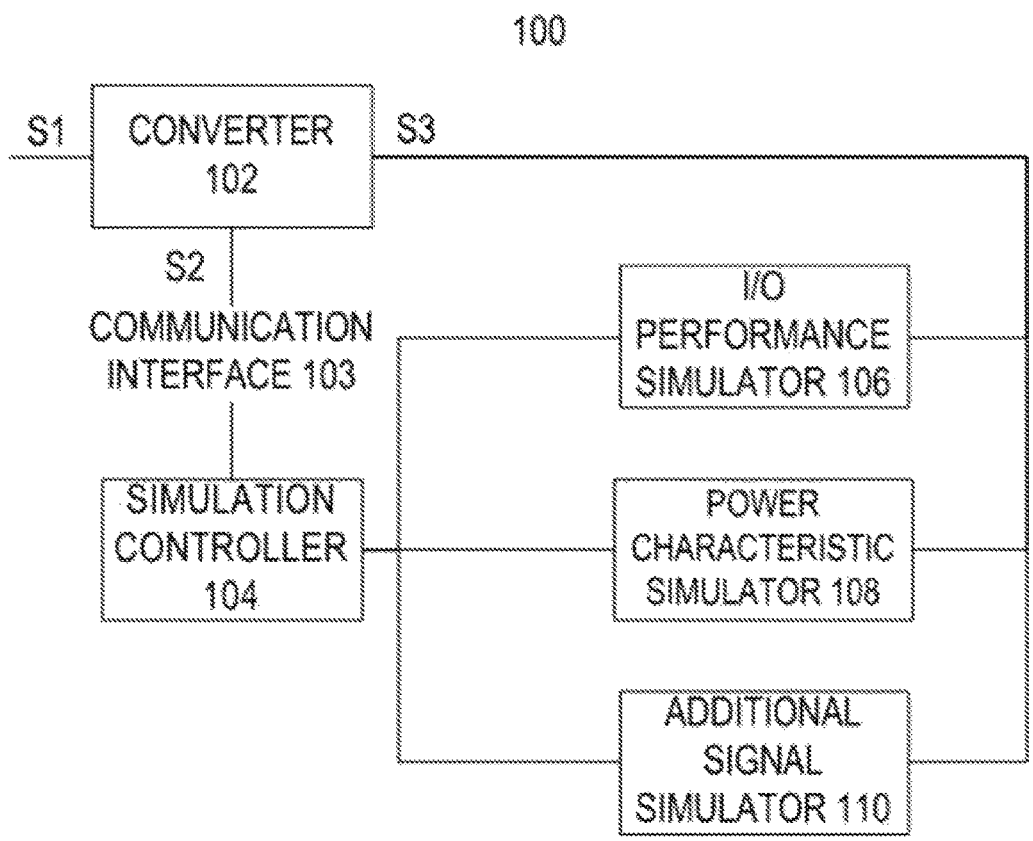
FIG. 1 illustrates a block diagram of a device 100 for simulating a disk drive according to the embodiments of the present disclosure.

Various example embodiments of the present disclosure will be described in detail with reference to the accompanying drawings. The flow diagrams and block diagrams in the accompanying drawings illustrate system architecture, functions, and operations which are possibly implemented by the methods and device according to various embodiments of the present disclosure. It should be understood that each block in the flow diagrams or block diagrams may represent a unit, a program segment, or a part of code; the unit, program segment, or part of code may include one or more executable instructions for implementing logical functions as prescribed in various embodiments. It should also be noted that in some alternative implementations, the functions indicated in the blocks may also occur in a sequence different from what is indicated in the drawings. For example, two consecutively expressed blocks actually may be executed substantially in parallel, or they sometimes may be executed in a reversed order, depending on the involved functions. Likewise, it should be noted that each block in the flow diagrams and/or block diagrams, and a combination of blocks in the flow diagrams and/or block diagrams, may be implemented using a specific hardware-based system that, performs prescribed functions or operations, or may be implemented using a combination of specific hardware and computer instructions.

The terms "comprise," "include" and similar terms as used herein should be understood as open terms, that is, "comprise/include, but not limited to". The term "based on" refers to "at least in part based on". The term "one embodiment" refers to "at least one embodiment." The term "another embodiment" or "a further embodiment" indicates "at least one further embodiment". Relevant definitions of other terms will be provided in the depiction below.

FIG. 1 illustrates a block diagram of the device 100 for simulating a disk drive according to the embodiments of the present disclosure. The device 100 comprises a converter 102, a simulation controller 104 and a plurality of simulators 106-110. Optionally, the plurality of simulators comprise at least two of an I/O performance simulator 106, a power characteristic simulator 108 and an additional signal simulator 110. That is, the plurality of simulators comprises a various types of simulators. The simulation controller 104 is connected to the converter 102 via a communication interface 103, the I/O performance simulator 106, the power characteristic simulator 108 and the additional signal simulators 110 are connected to connector 102 and simulation controller 104 respectively.

In some embodiments, the converter 102 receives a first signal S1 for operating the device 100 and converts the first signal S1 into a second signal S2 (such as a control signal) and a third signal S3 (such as a business signal). In some embodiments, the converter 102 is connected to an external expander of the device 100. For example, the expander may connect the disk drive to the main board, and the expander may be a hard-disk cartridge. The converter 102 is used to convert interfaces of different vendors into the standard interface so that each of the plurality of simulators can be adapted to varied user-defined interfaces of different disk vendors. The converter 102 may use the traditional example model for test. Additionally, the control path of converter 102 may use various interfaces, such as $I^2C$ bus interface or the dedicated bus interface for the simulator (such as a user-defined bus interface described in the following text). The converter 102 can support TTL and CMOS level to be equipped with adaptability to all the industry power level.

In some embodiments, the simulation controller 104 receives a second signal S2 from the converter 102 via the communication interface 103 (e.g. control signal related to the control of the disk drive) and controls the simulation mode of the device 100 based on the second signal S2. For example, the simulation controller 104 may be further configured to control the switching mode and/or working mode of each of the plurality of simulators based on the second signal S2 received from the converter 102. Alternatively, the simulation controller 104 may analyze the received second signal S2 and determine the simulation type involved in the second signal S2 so as to configure the switching mode and the respective working mode for each of the plurality of simulators. For example, the simulation controller 104 may control the switching state of simulators 106-110 and configure them in different working modes. The simulation controller 104 can work stably under extreme conditions (such very cold or hot) and may control delay time, power consumption and additional signal verification with a communication interface.

In some embodiments, the switching mode and/or working mode of the plurality of simulators 106-110 may be controlled by the simulation controller 104. For the disk simulator that has been switched on, disk simulators 106-110 may receive a third signal S3 from the converter 102 (e.g. business signal related to the disk drive) and simulate the plurality of functions associated with the disk drive based on the third signal S3.

In some embodiments, a plurality of simulators 106-110 may be configurable for different phases of power consumption. In other words, not only the simulation manner of the simulator is configurable, but also the combination of simulation between a plurality of simulators is configurable. For example, the simulation mode of each simulator may be configured with hardware or software], and the combined working mode of a plurality of stimulators may be configured such that the disk drive stimulation device 100 is highly configurable and expandable, thus enabling to simulate various output features of the disk drive.

In some embodiments, one or more of the disk simulators 106-110 can be implemented with elements known in the field, for example, a combined configuration of electrical resistance or capacitance, and so on. Optionally, one or more of the disk simulators 106-110 may simulate the corresponding functions of the disk drive with software. For example, DiskSim simulator developed by Cameron University is an example of this type of simulator.

In some embodiments, the I/O performance simulator 106 may have different working modes, such as a simple mode and a simulation mode. In the simple mode, the I/O performance simulator 106 may merely simulate the physical state of the disk drive; in the simulator mode, the I/O performance simulator 106 may simulate the whole of the disk drive, for example, a serial connected SCSI (SAS) disk, a serial ATA (SATA) disk and an optical fiber channel (FC) disk. In the practical specific simulation process, the I/O performance simulator 106 may be configured either in simple mode or stimulation device mode according to the requirement of working conditions.

In some embodiments, the power characteristic simulator 108 may be configurable for different phases of power consumption. For example, the power characteristic simulator 108 may be configured to simulate power consumption features of hard disk drive (HHD) or solid-state drive (SSD). For HDD, there are three power consumption phases, namely, a spin-up phase, a standby phase and a normal working phase. In the spin-up phase, the power consumption will be the highest due to accelerated spinning, and in the standby phase, the power consumption will be the lowest. For SSD, the power consumption at the spin-up phase is the highest and remains constant under normal working. Due to different power consumption features, the power characteristic simulator 108 may be configured to provide configurable interfaces and different loads to simulate different phases of power consumption, thereby facilitating power configuration at the spin-up phase.

In some embodiments, the additional signal simulator 110 may be configurable for different types of disk drives. For example, it can be configured to simulate some output features of the disk drive other than I/O performance and power characteristics, such as inserting signal features and indicator features, for different vendors. To better adapt to different configuration of all the vendors, the additional signal simulator 110 may provide General Purpose Input/Output (GPIO) to provide additional controlling and monitoring functions and adapt to TTL and CMOS level through configuration of the convertor.

In some embodiments, I/O performance simulator 106, power characteristic simulator 108 and additional signal simulator 130 can perform simulation separately. For example, the spin-up sequence of the disk drive hardware may be simulated with the I/O performance simulator 106, and the spinning accelerating spin-up phase of the disk drive may be simulated with the power characteristic simulator 108. In some embodiments, the simulation controller 104 is further configured to configure the disk drive simulator in different simulation modes by combining the plurality of simulators, for instance, at least two of three simulators are combined to generate a combined multi-functional device for simulating the disk drive. For example, I/O operation of disk drive in normal working state may be simulated by combining the I/O performance simulator 106 and the power characteristic simulator 108. Additionally, more output features of the disk drive may be simulated by combining the I/O performance simulator 106, the power characteristic simulator 108 and the additional signal simulator 110.

The communication interface 103 is used for the communication between the converter 102 and the simulation controller 104. In some embodiments, in order to make the communication interface 103 efficient and stable, the communication interface 103 may be I²C bus interface, which is a serial bus comprised of data line SDA and clock line SCL and is a stable bus standard widely adopted in the microelectronic communication control field. The I²C bus, which is based on the power source bus protocol, has an advantage of few interface lines, simple control manner, small form of device package and high speed of communication, and so forth.

In some embodiments, in order to make the communication interface 103 more efficient and stable, the communication interface 103 may be user-defined. For example, the user-defined bus interface may be based on user-defined protocol and can have two buses (such as a simple communication mode) or three buses (such as a complete communication mode), and work stably on TTL or CMOS level. Alternatively, user-defined bus interface is compatible with I²C bus interface and can be combined into more complicated, communication logic.

In some embodiments, the user-defined bus interface is only operated with GPIO and can be provided with a configuration and a reading interface. Alternatively, the user-defined bus comprises a control bus and a data bus, and the control bus, is used for controlling starting, ending and operation type of communication, comprising one GPIO output, wherein the control bus pulls up the electrical level to make the signal more stable. The data bus is used for sending address and reading and writing data of the register during the communication and comprises one GPIO input and output, wherein the data bus switches to the open drain mode to provide better arbitrary support.

Figure 2:
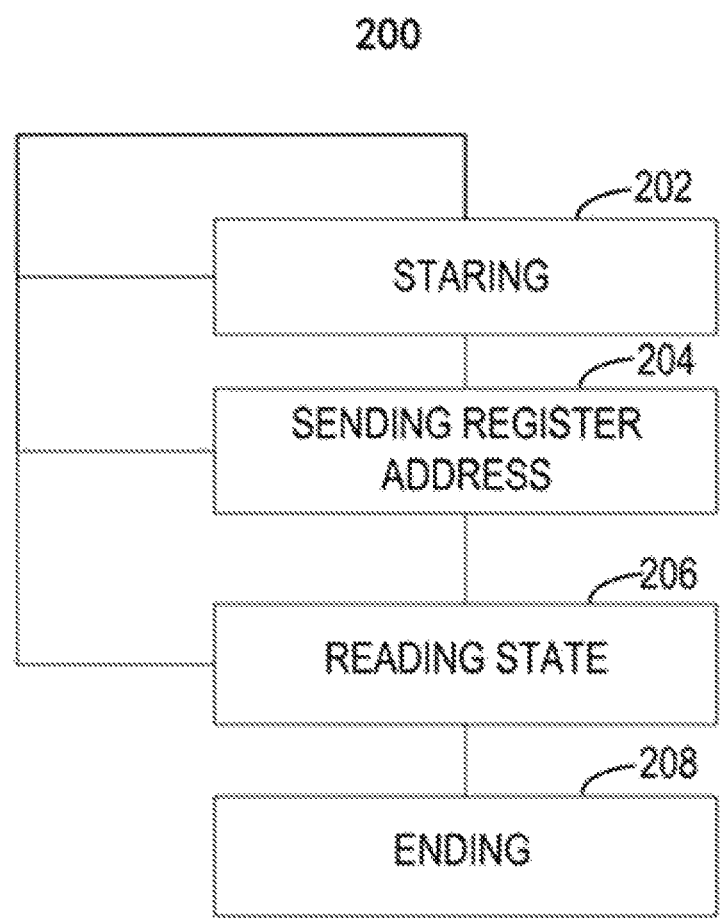
FIG. 2 illustrates a flow diagram 200 of a process of a user-defined protocol according to the embodiments of the present disclosure.
Figure 3:
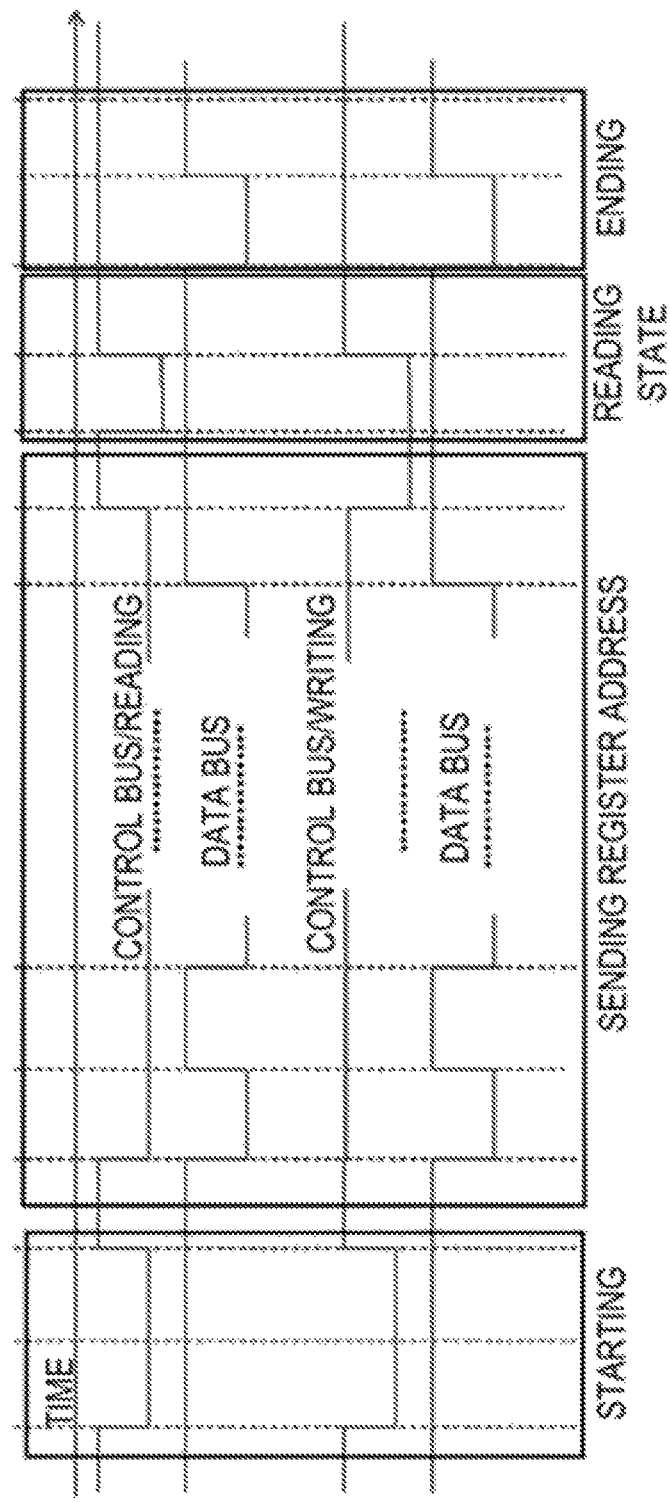
FIG. 3 illustrates a sequence diagram 300 of a process of the user-defined protocol according to the embodiments of the present disclosure.

Now referring to FIGS. 2 and 3 describing an example of the user-defined bus. FIG. 2 illustrates a communication flow map 200 with user-defined protocol according to the embodiments of the present disclosure. There are four phases of the communication process of the user-defined communication interface, including, starting up phase 202, sending register address phase 204, reading state phase 206, ending phase 208. In the start-up phase 202, starting with drawing down the level with the control bus to notify the receiver of the starting of communication, and the level returns to high level when the control bus is released. As the user-defined protocol is defined as a single communication process, the target starts to receive register address. At the phase 204 of sending register address, the register address is sent by the user-defined bus. At reading phrase 206, after the register address has been sent, the receiver returns the register value to the sender via the control bus. When the sender reads the value, it pulls up the level with a control bus and sends the signal to the receiver to stop the communication process. At this point, the communication process to the ending phrase 208.

FIG. 3 illustrates a communication sequence map 300 with user-defined protocol according to the embodiments of the present disclosure, corresponding to the staring phase, the phase of sending the register address, the phase of the reading state and the ending phase. At the phase of sending the register address, when the control bus is at low level, the control bus is in the reading mode; when the control bus is at high level, the control bus is in the write-in mode. Therefore, the user-defined protocol is convenient for use, simple and efficient, and can be implemented directly in the current hardware and restored easily from wrong conditions. Furthermore, the user-defined protocol has no rigid requirement for timing, thus being applicable by hardware and supported by software.

The disk drive simulator 100 simulates the disk drive by configuring a plurality of simulations, and achieves simulation of new disk drive products that are still in the stage of development. Therefore, the embodiments of present disclosure can simulate all the output features of the disk drive and can be configurable for different vendors, thereby effectively improving the simulation efficiency of the disk drive. Moreover, the device 100 may be used for simulating a plurality of disk drive products repetitively, thereby improving reusability of disk drive.

It should be understood that the apparatus 100 may be implemented in various manners. For example, in some embodiments, the apparatus 100 may be implemented in hardware, software or a combination of hardware and software, wherein the hardware part can be implemented by a specific logic, the software part can be stored in a memory and executed by a proper instruction execution system such as a microprocessor or a dedicated designed hardware. Those skilled in the art may appreciate that the above method and apparatus can be implemented with computer-executable instructions and/or control codes contained in the processor, for example, codes provided on a carrier medium such as a magnetic disk, CD, or DVD-ROM, or a programmable memory such as a read-only memory or a data carrier such as an optical or electronic signal carrier. The device and its components in the present embodiments may be implemented by hardware circuitry, for example a very large scale integrated circuit or gate array, a semiconductor such as logical chip or transistor, or a programmable hardware device such as a field-programmable gate allay, or a programmable logical device, or implemented by software executed by various kinds of processors, or implemented by combination of the above hardware circuitry and software.

It should be noted that although the above detailed depiction mentions several units or sub-units of the apparatus, such partition is only example, rather than limitation. In actuality, the features and functions of two or more unit depicted above may be instantiated in one unit. In turn, features and functions of one unit described above may be further partitioned into more units so as to be instantiated.

Figure 4:
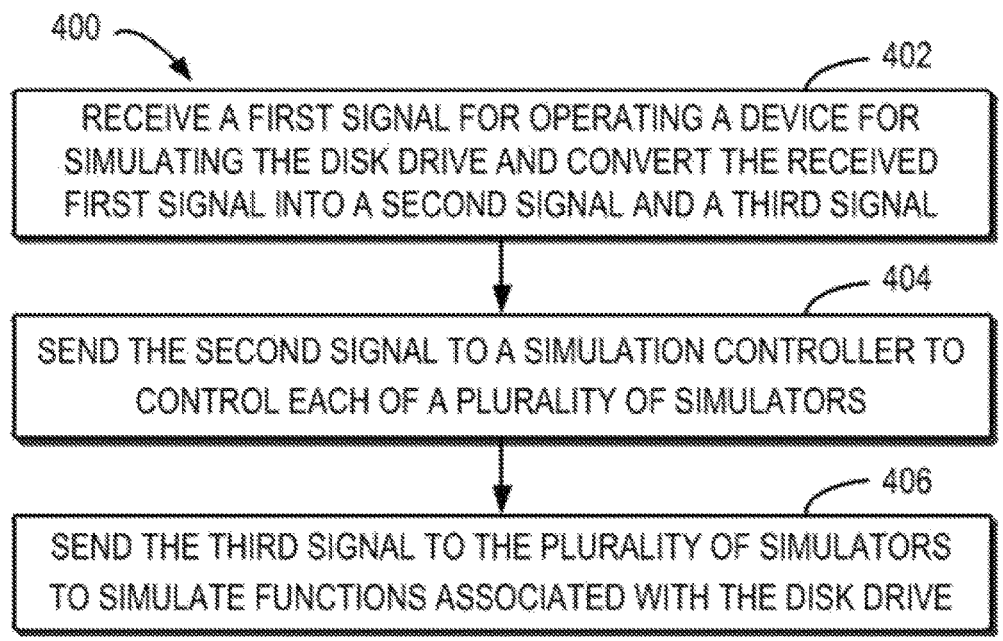
FIG. 4 illustrates a flow diagram of a method 400 for simulating a disk drive according to the embodiments of the present disclosure.

FIG. 4 schematically illustrates a flow diagram of the method 400 for simulating the disk drive simulation according to the embodiments of the present disclosure. At 402, a first signal S1 for operating the device for simulating the disk drive is received by the converter 102, and the received first signal S1 is converted into a second signal S2 (e.g. a control signal) and a third signal S3 (e.g. a business signal). At 404, the second signal S2 is sent to the simulation controller 104 via the communication interface 103 to control each of the plurality of simulators, and the plurality of simulators comprise at least two of the I/O performance simulator 106, the power characteristic simulator 108 and the additional signal simulation 110. At 406, the third signal S3 is sent by the converter 102 to the plurality of simulators to simulate a plurality of functions of the disk drive.

In some embodiments, the first signal for operating the device may be received from the external expander of the device. In some embodiments, the simulation controller may control the switching mode and the working mode of each of the plurality of simulators based on the second signal received from the converter. In some embodiments, the plurality of simulators may be configured in different simulation modes by combining the plurality of simulators.

In some embodiments, the I/O performance simulator may operate at a simple mode and a simulator mode, and in the simple mode, the I/O performance simulator simulates the physical state of the disk drive; while in a simulator mode, the I/O performance simulator simulates the overall disk drive. In some embodiments, the power characteristic simulator is configurable for different phases of power consumption In some embodiments, the additional signal emulation device is configurable for different types of disk drives.

In some embodiments, the communication interface is an I²C bus interface. Alternatively, the communication interface may be a user-defined bus interface, and the user-defined bus comprises a control bus and a data bus, and the control bus is used for controlling starting, ending and operation type of the communication, and the data bus is used for sending register address and reading and writing data during the communication. In some embodiments, when the control bus pulls down the level, the communication process starts; when the control bus pulls up the level, the communication process ends. In some embodiments, during the communication, when the control bus is in low level, the control bus is in the reading mode; when the control bus is in high level, the control bus is in the writing mode.

Figure 5:
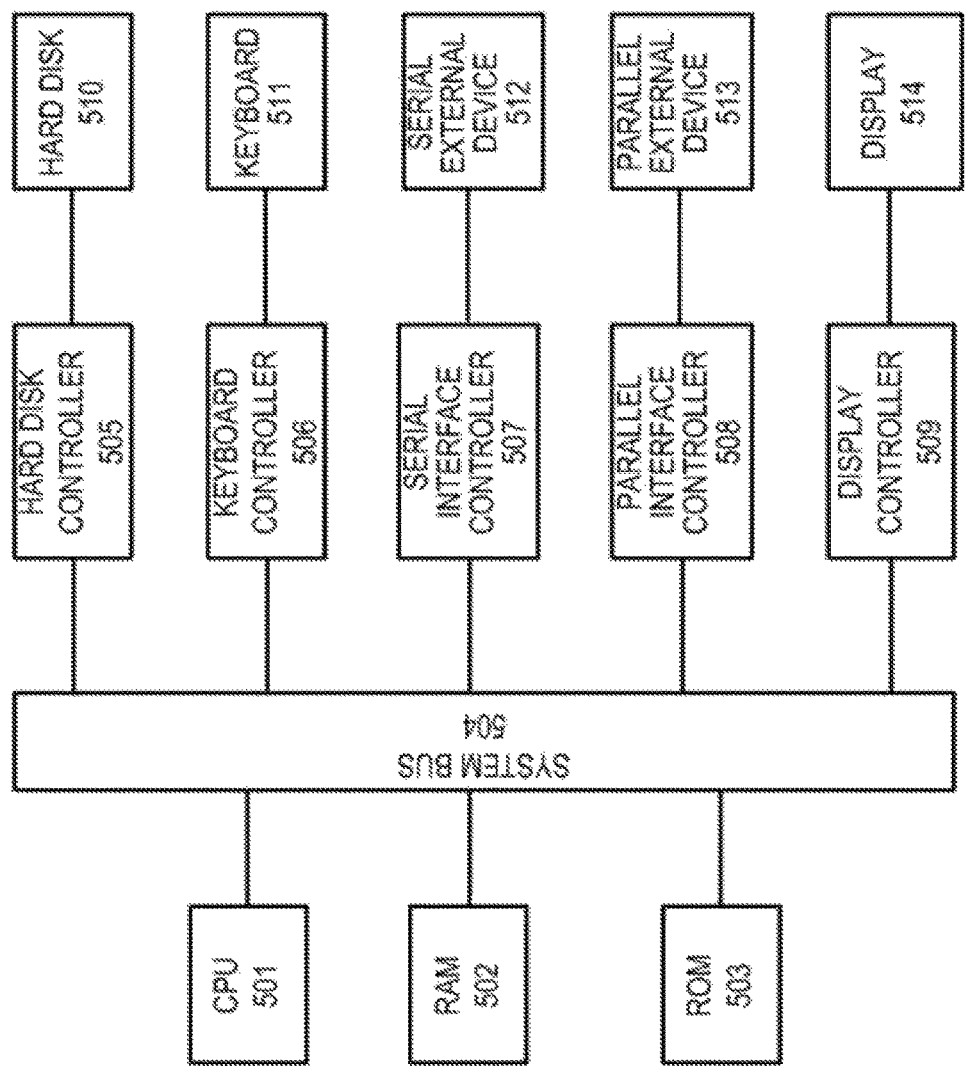
FIG. 5 illustrates a block diagram of a computer device 500 in which embodiments of the present disclosure may be implemented.

Hereinafter, a computer device in which embodiments of the present disclosure may be implemented will be described with reference to FIG. 5. FIG. 5 schematically illustrates a block diagram of a computer device 500 in which embodiments of the present disclosure may be implemented.

The computer system as shown in FIG. 5 comprises: a CPU (central processing unit) 501, a random access memory (RAM) 502, a read only memory (ROM) 503, a system bus 504, a hard disk controller 505, a keyboard controller 506, a serial interface controller 507, a parallel interface controller 508, a display controller 509, a hard disk 510, a keyboard 511, a serial external device 512, a parallel external device 513 and a display 514. In these devices, what are coupled to the system bus 504 include the CPU 501, the RAM 502, the ROM 503, the hard disk controller 505, the keyboard controller 506, the serial interface controller 507, the parallel interface controller 508, and the display controller 509. The hard disk 510 is coupled to the hard disk controller 505, the keyboard 511 is coupled to the keyboard controller 506, the serial external device 512 is coupled to the serial interface controller 507, the parallel external device 513 is coupled to the parallel interface controller 508, and the display 514 is coupled to the display controller 509. It should be understood that the structural block diagram as shown in FIG. 5 is only illustrated for example purposes, not for limiting the scope of the present invention. In some cases, some devices may be added or omitted according to the needs. Embodiments of the present disclosure may be stored as computer program codes in a storage device such as the hard disk 510 on the computer. The computer program codes, when loaded into for example an RAM to run, cause the CPU 501 to perform a method for simulating the disk drive according to embodiments of the present disclosure.

The present descriptions above are only optional embodiments, not intended to limit the present disclosure. To those skilled in the art, embodiments of the present disclosure may have various modifications and variations. Any modifications, equivalent replacements, and improvements within the spirit and principle of embodiments of the present disclosure should be included within the protection scope of embodiments of the present disclosure.

What is claimed is:

1. A device for simulating a disk drive, comprising:
   a converter configured to convert a received first signal for operating the device into a second signal and a third signal;
   a simulation controller configured to control a simulation mode of the device based on the second signal, the simulation controller being connected to the converter via a communication interface; and
   a plurality of simulators configured to simulate a plurality of functions associated with the disk drive based on the third signal, the plurality of simulators including at least two of an input/output (I/O) performance simulator, a power characteristic simulator and an additional signal simulator, and the plurality of simulators being connected to the converter and the simulation controller.

2. The device according to claim 1, wherein the converter is connected to an external expander of the device.

3. The device according to claim 1, wherein the simulation controller is further configured to:
   control at least one of a switching mode and a working mode of at least one of the plurality of simulators based on the second signal received from the converter.

4. The device according to claim 3, wherein the simulation controller is further configured to:
   configure the device in the simulation mode by combining modes of the plurality of simulators.

5. The device according to claim 4, wherein the I/O performance simulator simulates a physical state of the disk drive in a first mode, and the I/O performance simulator simulates a whole of the disk drive in a second mode.

6. The device according to claim 4, wherein the power characteristic simulator is configurable for different phases of power consumption.

7. The device according to claim 4, wherein the additional signal simulator is configurable for different types of disk drives.

8. The device according to claim 1, wherein the communication interface is an I²C bus interface.

9. The device according to claim 1, wherein the communication interface is a user-defined bus interface, and the user-defined bus includes a control bus used for controlling starting, ending and a operation type of a communication and a data bus used for transmitting a register address and data during the communication.

10. The device according to claim 9, wherein in response to the control bus being pulled down, the communication interface starts a process of the communication, and in response to the control bus being pulled up, the communication interface ends the process of the communication.

11. The device according to claim 9, wherein during the process of the communication, in response to the control bus being in a low level, the control bus is in a reading mode, and in response to the control bus being in a high level, the control bus is in a writing mode.

12. A method for simulating a disk drive, comprising:
receiving, by a converter, a first signal for operating a device for simulating the disk drive;
converting, by the converter, the received first signal into a second signal and a third signal;
sending, by the converter, the second signal to a simulation controller via a communication interface to control one or more of a plurality of simulators, the plurality of simulators including at least two of an input/output (I/O) performance simulator, a power characteristic simulator and an additional signal simulator; and
sending, by the converter, the third signal to the plurality of simulators to simulate a plurality of functions associated with the disk drive.

13. The method according to claim 12, wherein the receiving a first signal for operating a device for simulating the disk drive comprises:
receiving the first signal from an external expander of the device.

14. The method according to claim 12, wherein the sending the second signal to a simulation controller comprises:
sending the second signal to the simulation controller such that the simulation controller controls at least one of a switching mode and a working mode of at least one of the plurality of simulators based on the second signal.

15. The method according to claim 14, wherein sending the second signal to a simulation controller comprises:
configuring the device in the simulation mode by combining modes of the plurality of simulators.

16. The method according to claim 15, further comprising:
causing the I/O performance simulator to simulate a physical state of the disk drive in a first mode, and
causing the I/O performance simulator to simulate a whole of the disk drive in a second mode.

17. The method according to claim 15, wherein the power characteristic simulator is configurable for different phases of power consumption.

18. The method according to claim 15, wherein the additional signal simulator is configurable for different types of disk drives.

19. The method according to claim 12, wherein the communication interface is an I²C bus interface.

20. The method according to claim 12, wherein the communication interface is a user-defined bus interface, and the user-defined bus includes a control bus used for controlling starting, ending and a operation type of communication and a data bus used for transmitting a register address and data during the communication.

21. The device according to claim 1, wherein the plurality of simulators includes:
I/O performance simulator circuitry constructed and arranged to simulate I/O operation of a real disk drive,
power characteristic simulator circuitry constructed and arranged to simulate power characteristics of the real disk drive, and
additional signal simulator circuitry constructed and arranged to simulate vendor-specific features of the real disk drive; and
wherein the I/O performance simulator circuitry, the power characteristic simulator circuitry, and the additional signal simulator circuitry operate in a combined manner to simulate a real disk drive to an external storage product under test.

* * * * *